United States Patent [19]
Kato et al.

[11] Patent Number: 5,172,261
[45] Date of Patent: Dec. 15, 1992

[54] OSCILLATORY MIRROR DEVICE WITH TWO EXCITING MEANS

[75] Inventors: Shinji Kato, Aichi; Soya Takagi, Toyota; Kazuhiko Mori, Okazaki; Minoru Kawasaki, Toyota; Yuichi Minami, Houya, all of Japan

[73] Assignees: Toyota Jidosha Kabushiki Kaisha, Toyota; Akashi Corporation, Yokohama, both of Japan

[21] Appl. No.: 782,342

[22] Filed: Oct. 24, 1991

[30] Foreign Application Priority Data

Nov. 1, 1990 [JP] Japan .................. 2-296477

[51] Int. Cl.5 ............................. G02B 26/10
[52] U.S. Cl. ..................... 359/214; 359/224; 359/198; 250/347
[58] Field of Search ............... 359/213, 214, 221, 223, 359/224, 225, 226, 838, 844, 846, 849, 881, 198; 250/347, 348

[56] References Cited

U.S. PATENT DOCUMENTS

| | | | |
|---|---|---|---|
| 1,438,974 | 12/1922 | Wente | 359/224 |
| 3,532,408 | 10/1970 | Dostal | 359/214 |
| 3,758,199 | 9/1973 | Thaxter | 359/223 |
| 4,632,501 | 12/1986 | Glynn | 359/213 |
| 4,659,932 | 4/1987 | Roll | 250/347 |
| 4,660,941 | 4/1987 | Hattori et al. | 359/224 |
| 4,690,486 | 9/1987 | Roll et al. | 359/214 |
| 4,705,365 | 11/1987 | Wakita et al. | 359/224 |
| 4,732,440 | 3/1988 | Gadhok | 359/214 |

FOREIGN PATENT DOCUMENTS

58-184080  10/1983  Japan .

*Primary Examiner*—Loha Ben
*Attorney, Agent, or Firm*—Oblon, Spivak, McClelland, Maier & Neustadt

[57] ABSTRACT

An oscillatory mirror device having a mirror and a pair of exciting systems to exert a couple of forces to turn the mirror around an axis of oscillation in an oscillating manner.

11 Claims, 6 Drawing Sheets

OSCILLATORY MIRROR DEVICE WITH TWO EXCITING MEANS

BACKGROUND OF THE INVENTION

1. Field of the Invention

The present invention relates to an oscillatory mirror device suitable for use to oscillate light beams such as laser beams in a laser beam working.

2. Description of the Prior Art

As is disclosed in, for example, Japanese Patent Laid-open Publication 58-184080, the oscillatory mirror device for use in a laser working was conventionally generally constructed to comprise a mirror, a rotary shaft connected with the mirror to define an axis of oscillation of the mirror, a base structure for supporting the rotary shaft to oscillate about an axis of oscillation, and an exciting means engaging a portion of the mirror distant from the axis of oscillation.

In the above-mentioned conventional construction of the oscillatory mirror, the rotary shaft is exerted with side forces perpendicular to the longitudinal axis thereof due to the exciting forces applied to the mirror from the exciting means so that the rotary shaft exerts eccentric forces to the bearing means which support the shaft from the base structure, thereby causing an early wearing or failure of the bearing means, resulting in various troubles such as incorrect alignment of the laser beams, difficulty in maintaining high frequency of oscillation, undue vibrations of the mirror, high noise, etc.

SUMMARY OF THE INVENTION

It is therefore the object of the present invention to provide an improved oscillatory mirror which is less liable to vibration, has improved durability, and can oscillate light beams at high frequency with high efficiency.

According to the present invention the above-mentioned object is accomplished by an oscillatory mirror device comprising a mirror, a mirror support means for supporting the mirror to turn around an axis of oscillation, and a pair of exciting means exerting a couple of forces (a force couple) to portions of the mirror distant from the axis of oscillation in opposite directions so as to turn the mirror around the axis of oscillation in an oscillating manner.

According to the above-mentioned construction, the forces exerted to the mirror from the pair of exciting means can generate a moment to turn the mirror about the axis of oscillation without driving the mirror sidewardly relative to the mirror support means so that the support means operates as a genuine pivot bearing means well balanced in radial loading.

The pair of exciting means may be provided in parallel on one side of the mirror, the pair of exciting means exerting forces to the mirror along axes substantially parallel to one another but opposite to one another in orientation.

The exciting means may each comprise a cup shaped housing made of a magnetic material, a magnet member mounted in the housing so as to be fixed at a first end thereof to a bottom portion of the cup shaped housing and to have a free second end opposite to the first end thereof near an open end of the cup shaped housing, an end plate made of a magnetic material closing the open end of the cup shaped housing with a central portion thereof being open to receive the free second end of the magnet in the central opening thereof thereby defining an annular clearance therebetween, a pendulum member having an annular solenoid coil disposed in the annular clearance and supported from the combination of the housing and the end plate via a resilient support means so as to be reciprocable along an axis common to the cup shaped housing, the magnet, the end plate and the pendulum member, wherein the cup shaped housing, the magnet and the end plate are formed with central openings along the common axis, and a shaft member is passed through the central openings with a first end thereof being connected with the pendulum member and a second end thereof opposite to the first end being connected with the mirror.

The resilient support means supporting the pendulum member from the combination of the housing and the end plate may comprise a plurality of arcuate leaf spring members arranged in a circle, each arcuate leaf spring member having an inside portion defining a concave side thereof flexibly supported from an outside portion defining a convex side thereof as separated by a slit, the inside portion being engaged with the pendulum member while the outside portion is mounted to the combination of the housing and the end plate.

The resilient support means may comprise two layers of the arcuate leaf spring members arranged in a circle as assembled together with an annular spacer member sandwiched therebetween.

The exciting means may further comprise a first compression coil spring disposed between the free end of the magnet and the pendulum member and a second coil spring disposed between the bottom portion of the cup shaped housing and the mirror.

The mirror support means may comprise a frame means, and a cross member having a pair of first arms holding the mirror and a pair of second arms perpendicular to the first arms pivotably supported from the frame means.

The cross member may be pivotably supported from the frame means via a pair of cross spring means arranged to define the axis of oscillation along the central axis thereof.

BRIEF DESCRIPTION OF THE DRAWING

In the accompanying drawing.

DESCRIPTION OF THE PREFERRED EMBODIMENT

In the following the present invention will be described in more detail with respect to an embodiment thereof with reference to the accompanying drawing.

Figure 1:
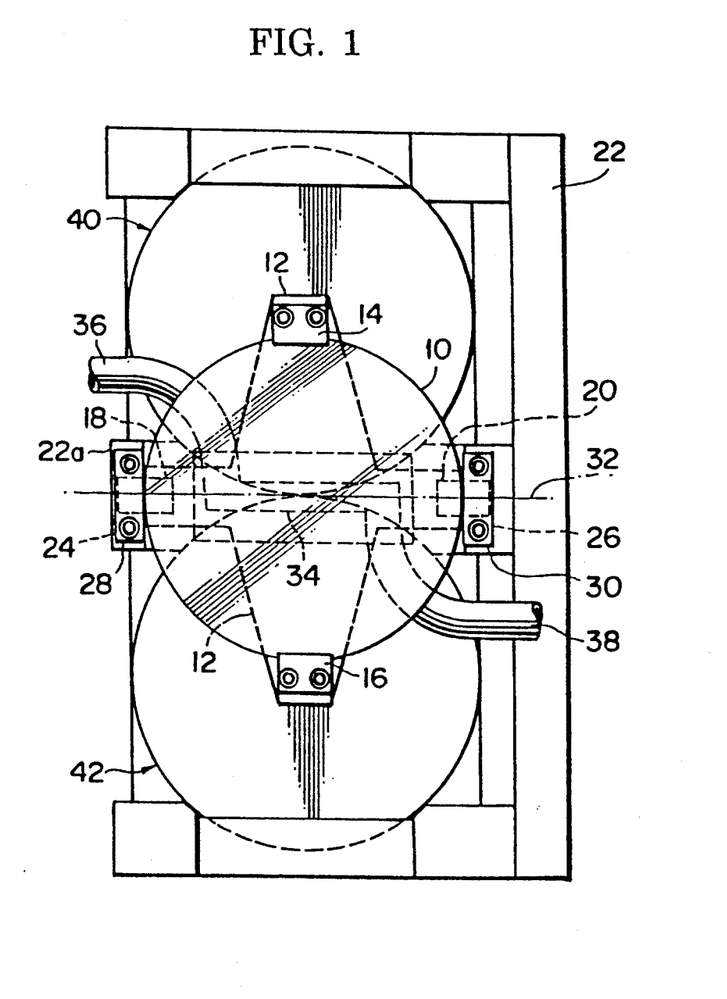
FIGS. 1 and 2 are front and side views of an embodiment of the oscillatory mirror device according to the present invention, respectively.

Referring to the drawing showing an embodiment of the oscillatory mirror device according to the present invention, a circular mirror designated by 10 for reflecting light beams such as the laser beams is positioned at a central portion of the device as viewed in the front view of FIG. 1, as supported by a mirror holder 12. The mirror holder 12 is a cross shaped member as viewed in the front view of FIG. 1, having a pair of vertically extending arms holding the mirror 10 with cooperation of clamp pieces 14 and 16 and a pair of horizontally extending arms pivotably supported from bearing means described hereinunder.

The opposite ends of the horizontal arms bear cross springs 18 and 20 at inside half portions thereof. The cross spring comprises two leaf springs assembled to have a shape of the cross in a cross section and is elastically twistable about the central axis thereof. The outside half portions of the cross springs 18 and 20 are supported from a frame 22 having a generally "E" shape as viewed in the front view of FIG. 1, the frame having a central arm portion 22a at which are mounted plate members 24 and 26 which in turn support the outside half portions of the cross springs 18 and 20 with cooperation of clamp pieces 28 and 30, respectively. The cross springs 18 and 20 are arranged to axially align with one another to define an axis of oscillation 32 extending along the central axis thereof around which the mirror 10 is oscillated as supported generally across the center thereto. Thus the mirror 10 can oscillate around the axis of oscillation 32 under the elastic twisting deformation of the cross springs 18 and 20. The mirror holder 12, the cross springs 18 and 20, the frame 22, the plate members 24 and 26 and the clamp pieces 28 and 30 provide a support means for supporting the mirror 10 to oscillate around the axis of oscillation 32. The combinations of the cross springs 18 and 20, the tip portions of the plate members 24 and 26 and the clamp pieces 28 and 30 may be replaced by any appropriate conventional radial bearing construction.

The mirror holder 12 is formed with a coolant passage 34, and a coolant is conducted through this passage as supplied from a hose 36 and exhausted to a hose 38, both being connected to opposite ends of the coolant passage, so that the mirror is appropriately cooled.

A pair of exciting means 40 and 42 are provided behind the mirror 10 and the mirror holder 12 as mounted to the frame 22. The exciting means 40 and 42 have shafts 44U and 44L extending along axes 41U and 41L, respectively, the shafts each being connected with a tip end portion of the vertical arm of the mirror holder 12 as screwed into a rear portion thereof opposite to the front portion thereof where it carries the clamp piece 14 or 16. The axes 41U and 41L extend in parallel to one another as equally distant from the axis of oscillation 32 as seen in the side view of FIG. 2.

Figure 3:
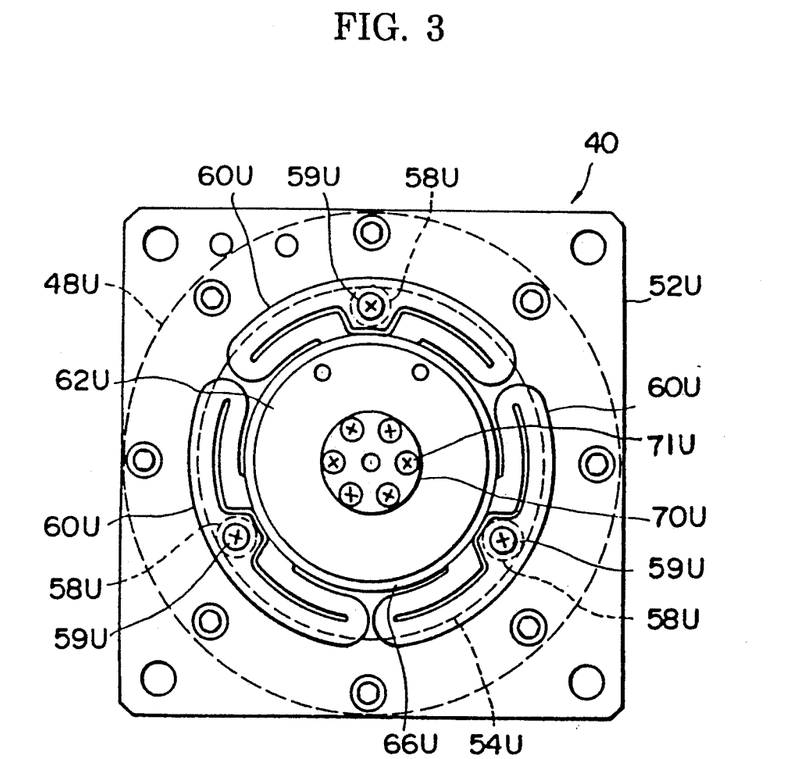
FIGS. 3 and 4 are rear and sectional side views of the exciting means incorporated in the oscillatory mirror device shown in FIGS. 1 and 2 with a shaft member thereof being removed for the purpose of illustration, respectively.
Figure 4:
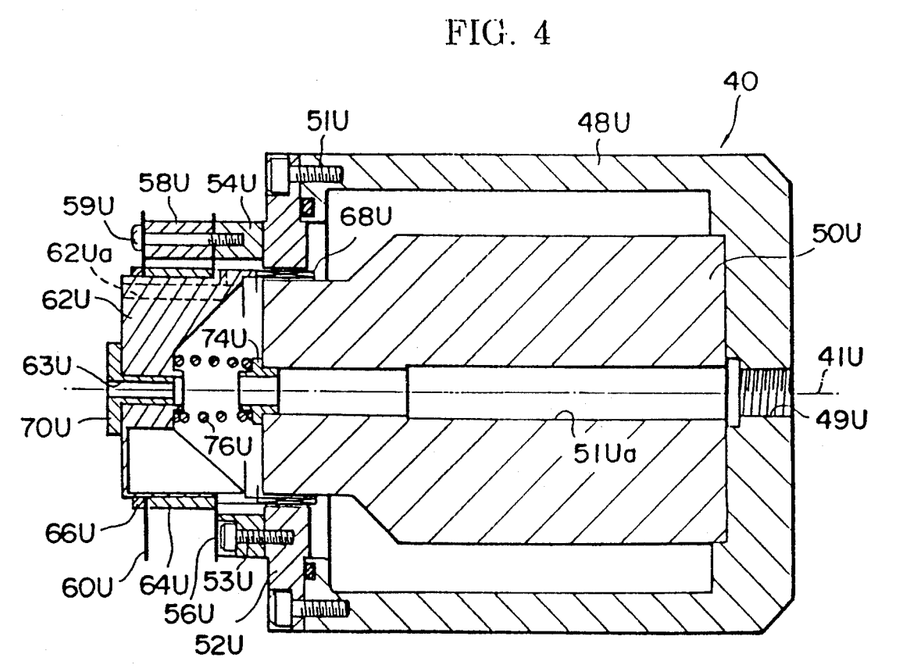

The construction of the exciting means is shown in more detail in FIGS. 3 and 4 with respect to the upper exciting means 40. It comprises a cup shaped housing member 48U made of a magnetic material in which a magnet 50U is mounted as fixed at the bottom portion of the cup shaped housing member, while the open end portion of the cup shaped housing member is closed with an end plate 52U made of a magnetic material and fastened thereto by bolts 51U, the end plate 52U having a central opening through which a free end portion of the magnet 50U is exposed with an annular clearance being left therearound.

An annular support member 54U is mounted to the end plate 52U by bolts 53U. Three arcuate leaf spring members 56U arranged in a circle, an annular spacer member 58U and three arcuate leaf spring members 60U also arranged in a circle are axially laid one over the other and mounted to the annular support member 54U by three bolts 59U, each passing through a central portion of each arcuate leaf spring members 56U and 60U and the annular spacer member 58U so as to fasten those members together, so that the annular assembly of these members is aligned with the axis 41U.

Figure 5:
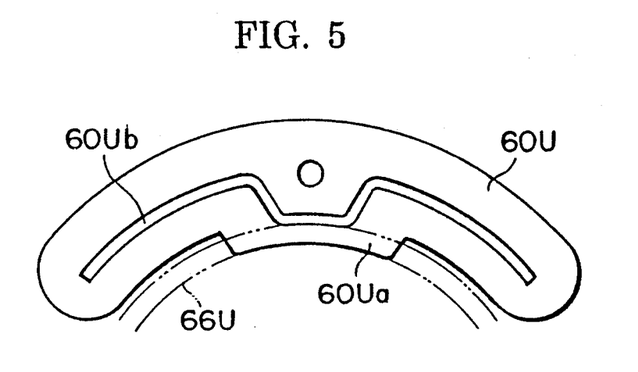
FIG. 5 is an enlarged illustration of an arcuate leaf spring member incorporated in the exciting means shown in FIG. 3.

Each of the arcuate spring members 56U and 60U has a structure as shown in FIG. 5 with respect to one of the arcuate leaf spring members 60U, having a projection 60Ua at a central portion of its inside portion defining the concave contour thereof separated from an outside portion defining the convex contour thereof by an arcuate slit opening 60Ub extending over a substantial length thereof to turn around a central opening 60Uc for receiving the bolt 59U.

A pendulum member 62U is supported by the arcuate leaf spring members 56U and 60U as engaged with the inner projections like the projections 60Ua in the members 60U, with a cooperation of ring members 64U and 66U. In more detail, the pendulum member 62U has a shouldered cylindrical outer surface corresponding to the arcuate inner edges of the inner projections. An annular shoulder portion thereof engages with the inner projections of the arcuate leaf spring members 56U which are sandwiched between the annular shoulder portion and one axial end face of ring member 64U mounted around the cylindrical outer surface of the pendulum member, and the inner projections 60Ua of the arcuate leaf spring members 60U are sandwiched between the other axial end face of the ring member 64U and the ring member 66U mounted around the cylindrical outer surface of the pendulum member. The ring member 64U has the same axial length as the annular spacer member 58U. Thus the pendulum member 62U is reciprocable in an oscillating manner relative to the stationary support means including the housing 48U, the annular support member 54U and the annular spacer member 58U along the axis 41U under the elastic support by the arcuate leaf spring members 56U and 60U.

A cylindrical solenoid coil 68U is mounted at an inner end portion of the pendulum member 62U as positioned in the annular clearance left between the central opening of the end plate 52U and the free end portion of the magnet 50U to be slightly out of contact with the opposing members. When an alternating electric current is supplied through the solenoid coil 68U, an alternating axial force is correspondingly exerted to the solenoid coil, so that the pendulum member 62U is thereby correspondingly oscillated.

The bottom portion of the cup shaped housing 48U, the magnet 50U and the pendulum member 62U are formed with bores 49U, 51Ua and 63U aligned along the axis 41U for receiving a shaft 44U to be reciprocable therein, wherein the bore 63U in the pendulum member 62U is defined by a sleeve member 70U having a flange portion and mounted in a corresponding bore formed in the pendulum member 62U. The sleeve member 70U is fixed thereto by screws 71U (FIG. 3). One end of the shaft 44U is received in the bore 63U and fixed there by a nut 72U. A flanged sleeve member 74U is mounted in the bore 51Ua of the magnet at the free end thereof to provide a sheet for mounting a compression coil spring 76U biasing the pendulum member 62U away from the magnet 50U.

Figure 6:
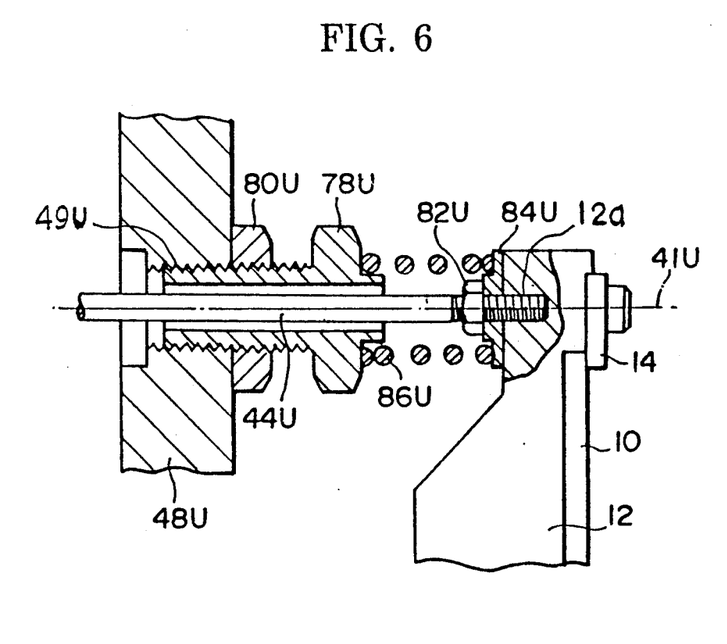
FIG. 6 is an enlarged illustration of an end portion of the exciting means shown in FIG. 2.

As shown in more detail in FIG. 6, a sleeve member 78U is mounted with its threaded portion to the bore 49U formed as a threaded bore at the bottom portion of the cup shaped housing 48U and is fixed there by a lock nut 80U. The other end of the shaft 44u is screwed at its threaded portion into a threaded bore 12a formed at an end portion of the mirror holder 12, and is fixed there by a nut 82U which also serves to mount a spring sheet member 84U for mounting a compression coil spring 86U which biases the end portion of the mirror holder 12 away from the bottom portion of the housing 48U.

Figure 2:
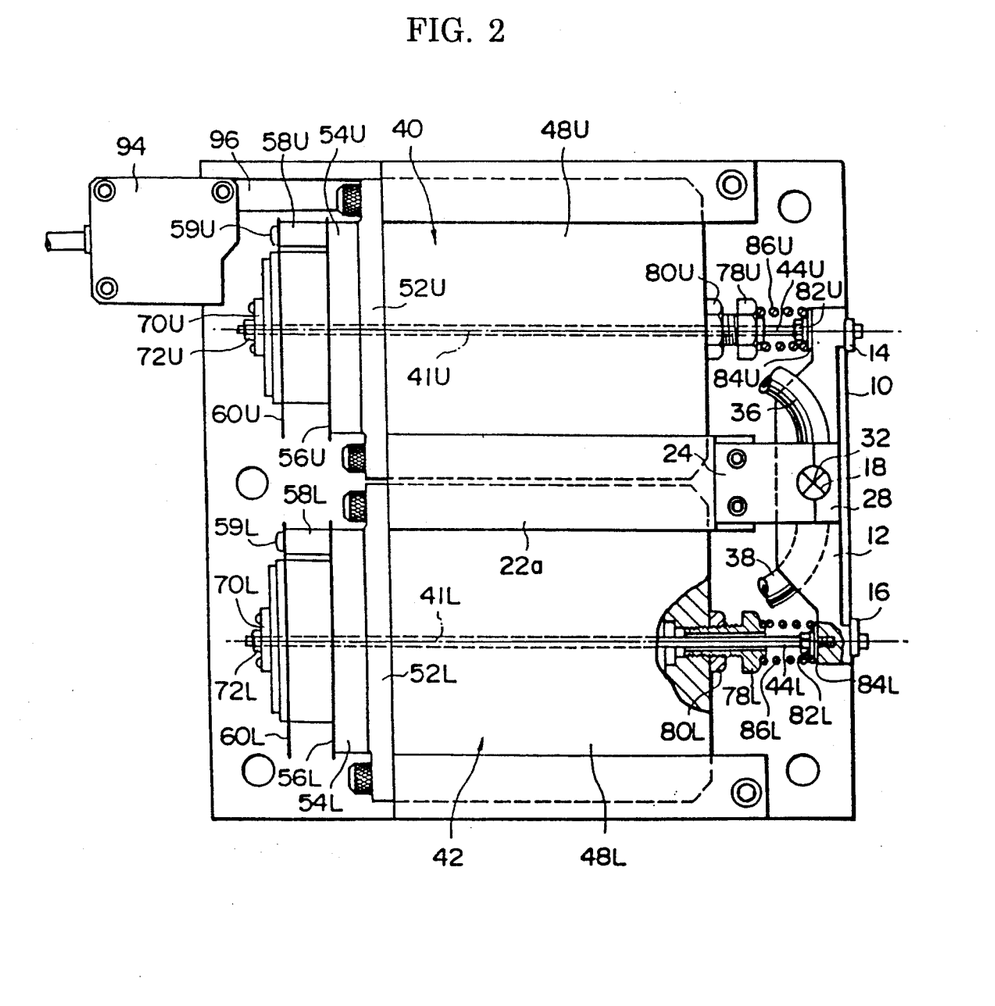

The exciting means 42 has the same construction as the exciting means 40. In FIG. 2 the portions of the exciting means 42 corresponding to those of the exciting means 40 are designated by the corresponding numbers accompanying "L" instead of "U".

Figure 7:
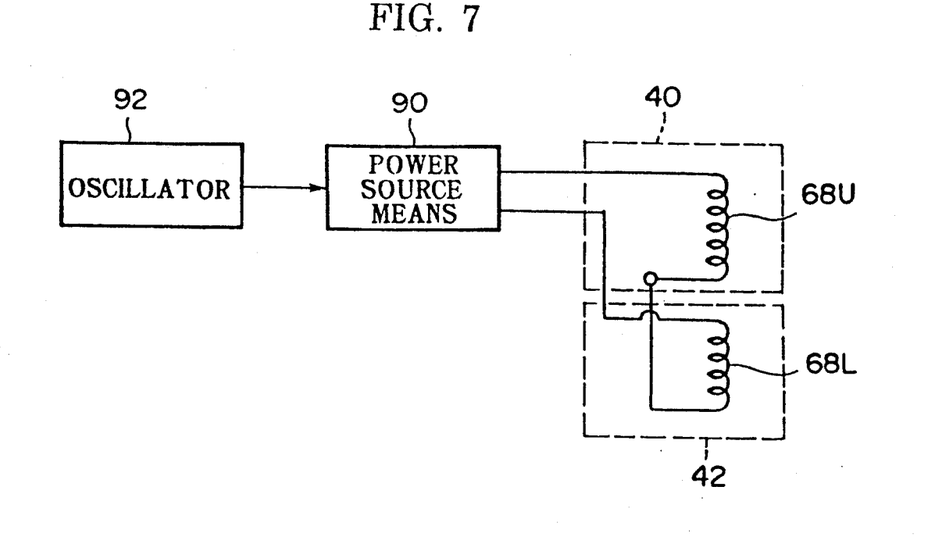
FIG. 7 is an electric circuit diagram showing the electric system of the oscillatory mirror device shown in FIGS. 1-6.

The solenoid coil 68U and a corresponding solenoid coil 68L in the exciting means 42 are electrically operated by an electric system as shown in FIG. 7. The solenoid coils 68U and 68L are connected in series and opposite to one another with respect to the orientation thereof. However, they may be connected in parallel, provided that they are energized in mutually opposite polarities. The solenoid coils 68U and 68L are supplied with an alternating electric current from a power source means 90 at a frequency controlled by an oscillator 92. As shown in FIG. 2 an amplitude sensor 94 is provided as mounted at the end plate 52U to detect the amplitude of the oscillating members and to indicate it in a display panel not shown in the figure.

In operation, when a power switch not shown in the figure is closed, an alternating electric current of a frequency set up in the oscillator 92 is supplied from the power source means 90 to the solenoid coils 68U and 68L which are thereby magnetized in an alternating manner in mutually opposite polarities.

According to such alternating mutually opposite magnetizations of the solenoid coils 68U and 68L the shafts 44U and 44L of the exciting means 40 and 42 are driven in oppositely leftward and rightward directions as viewed in FIG. 2, whereby the mirror 10 is oscillated around the axis of oscillation 32 as supported by the mirror holder 12 which pivots at the cross springs 18 and 20.

It is desirable that the resonance frequency of the total oscillation mass is adjusted to coincide with the driving frequency by the exciting means through adjustment of the inertial masses of the mirror 10, the mirror holder 12, the pendulum member 62U and 62L, the solenoid coils 68U and 68L, the shafts 44U and 44L, etc. and/or adjustment of the spring forces of the coil springs 76U, 76L, 86U and 86L according to adjustment of turning of the bolts 78U and 78L.

Figure 8:
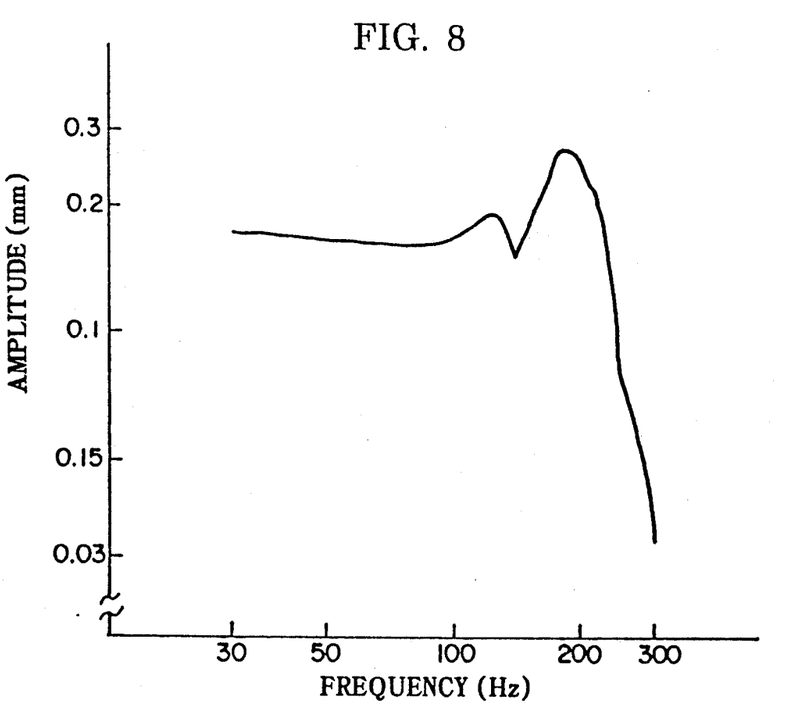
FIG. 8 a graph showing the relation between the frequency of excitement and the amplitude of oscillation in an actual embodiment of the present invention.

FIG. 8 shows an example of the performance of amplitude vs. frequency of the oscillatory mirror device shown in FIGS. 1-7, wherein the resonance frequency of the total oscillation mass was adjusted to be 200 Hz. The amplitude of oscillation was detected by the amplitude sensor 94. It will be appreciated that the oscillatory mirror device shows a relatively sharp resonating characteristic at the 200 Hz of the driving frequency.

Since the mirror holder 12 supporting the mirror 10 is always exerted with the exciting forces from a pair of exciting means 40 and 42 as a couple of forces to turn the mirror holder around the central axis of the cross springs 18 and 20 which is in coincidence with the axis of oscillation 32, no substantial side force is exerted to the cross springs 18 and 20 except the constant vertical force due to the weight of the mirror holder and the mirror. Therefore, the durability of the cross springs 18 and 20 is substantially extended. The same improvement in the durability of the pivotal supporting means will be available in any other convenient types of pivotal supporting means such as various conventional radial bearings having inner and outer race members when used instead of the cross springs 18 and 20. Further, since the exciting energy is not consumed in uselessly biasing the mirror and the mirror supporting means sidewardly in oscillating the mirror around the axis of oscillation, the efficiency of energy consumption is improved, with corresponding reduction of vibrations and noises.

Although the invention has been described in detail with respect to a particular embodiment thereof, it will be understood by those skilled in the art that various modifications are possible with respect to the shown embodiment without departing from the sprit of the present invention.

We claim:

1. An oscillatory mirror device comprising a mirror, a mirror support means for supporting said mirror to turn around an axis of oscillation, and a pair of exciting means exerting a couple of forces to portions of said mirror distant from said axis of oscillation in opposite directions so as to turn said mirror around said axis of oscillation in an oscillating manner, wherein said exciting means each comprises a cup shaped housing made of a magnetic material, a magnet member mounted in said housing so as to be fixed at a first end thereof to a bottom portion of said cup shaped housing and to have a free second end opposite to said first end thereof near an open end of said cup shaped housing, an end plate made of a magnetic material closing said open end of said cup shaped housing with a central portion thereof being open to receive said free second end of said magnet in said central opening thereof thereby defining an annular clearance therebetween, a pendulum member having an annular solenoid coil disposed in said annular clearance and supported from the combination of said housing and said end plate via a resilient support means so as to be reciprocable along an axis common to said cup shaped housing, said magnet, said end plate and said pendulum member, wherein said cup shaped housing, said magnet and said end plate are formed with central openings along said common axis, and a shaft member is passed through said central openings with a first end thereof being connected with said pendulum member and a second end thereof opposite to said first end being connected with said mirror.

2. An oscillatory mirror device according to claim 1, wherein said pair of exciting means are provided in parallel on the same side of said mirror, said pair of exciting means exerting forces to said mirror along axes substantially parallel to one another but opposite to one another in the orientation.

3. An oscillatory mirror device according to claim 1, wherein said resilient support means supporting said pendulum member from the combination of said housing and said end plate comprises a plurality of arcuate leaf spring members arranged in a circle, each said arcuate leaf spring member having an inside portion defining a concave side thereof flexibly supported from an outside portion defining a convex side thereof as separated by a slit, said inside portion being engaged with said pendulum member while said outside portion is mounted to the combination of said housing and said end plate.

4. An oscillatory mirror device according to claim 3, wherein said resilient support means comprises two layers of said arcuate leaf spring members arranged in a circle as assembled together with an annular spacer member sandwiched therebetween.

5. An oscillatory mirror device according to claim 1, wherein said exciting means further comprises a first compression coil spring disposed between said free end of said magnet and said pendulum member and a second coil spring disposed between said bottom portion of said cup shaped housing and said mirror.

6. An oscillatory mirror device according to claim 1, wherein said mirror support means comprises a frame means, and a cross member having a pair of first arms holding said mirror and a pair of second arms perpendicular to said first arms pivotably supported from said frame means.

7. An oscillatory mirror device according to claim 6, wherein said cross member is pivotably supported from said frame means via a pair of cross spring means arranged to define said axis of oscillation along the central axis thereof.

8. An oscillatory mirror device comprising:
a mirror;
a resilient mirror support supporting said mirror to turn about a fixed axis of oscillation;
first and second exciting means for exerting a force on said mirror support, wherein said first and second exciting means are connected to said mirror support at positions on opposite sides of said axis of oscillation;
means for exciting said first exciting means with an alternating polarity excitation signal such that the first exciting means exerts forces of alternatingly opposite directions on said mirror support; and
means for exciting said second exciting means with an alternating polarity excitation signal which is out of phase from the alternating polarity signal which excites said first exciting means, such that the second exciting means exerts forces on said mirror support which are of alternatingly opposite directions and which are opposite the forces exerted by said first exciting means.

9. The mirror device of claim 8 wherein said resilient mirror support comprises at least one spring.

10. An oscillatory mirror device comprising:
a frame means;
a mirror;
a mirror support means supporting said mirror to turn about an axis of oscillation fixed relative to said frame means;
first and second exciting means of the same construction as one another, each having a housing means stationarily supported from said frame means and a movable means resiliently supported from said housing means, said movable means each being movable along an axis of movement parallel to one another and equally distant from said axis of oscillation and connected with said mirror support at portions thereof on opposite sides of said axis of oscillation so as to exert a reciprocating force on said mirror support along said axis of movement thereof, said first and second exciting means each further including an electromagnetic means adapted to exert forces to said movable means thereof in opposite directions along said axis of movement thereof according to supply of electric currents in opposite directions and also spring means biasing said movable means along said axis of movement thereof; and
power source means for supplying an alternating electric current through said electromagnetic means for said first and second exciting means in mutually opposite directions.

11. The mirror device of claim 10, wherein said spring means are each adjustable of a spring constant thereof.

* * * * *